United States Patent
Gann

(10) Patent No.: US 7,403,302 B2
(45) Date of Patent: Jul. 22, 2008

(54) METHOD AND A SYSTEM FOR INDEXING AND TRACKING DIGITAL IMAGES

(75) Inventor: Robert G. Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 10/636,418

(22) Filed: Aug. 6, 2003

(65) Prior Publication Data

US 2005/0031190 A1 Feb. 10, 2005

(51) Int. Cl.
*G06F 15/00* (2006.01)
*G06F 17/30* (2006.01)

(52) U.S. Cl. .......................................... 358/1.15; 707/3
(58) Field of Classification Search ................ 358/1.15, 358/506, 504, 302, 403, 449, 1.9, 1.16; 707/3, 707/10, 104.1, 102, E17.082; 715/513, 526, 715/765; 709/225; 382/167, 305
See application file for complete search history.

(56) References Cited

U.S. PATENT DOCUMENTS

| | | | | |
|---|---|---|---|---|
| 6,154,755 A * | 11/2000 | Dellert et al. | ............... | 715/202 |
| 6,297,874 B1 * | 10/2001 | Ikeda et al. | ................... | 355/40 |
| 6,535,298 B2 | 3/2003 | Winter et al. | ............... | 358/1.16 |
| 6,634,559 B2 * | 10/2003 | Shioda et al. | ............... | 235/487 |
| 2002/0033965 A1 | 3/2002 | Winter et al. | | |
| 2002/0051201 A1 | 5/2002 | Winter et al. | | |
| 2003/0160995 A1 * | 8/2003 | Oka et al. | .................. | 358/1.15 |

OTHER PUBLICATIONS

Search Report Application No. GB0416260.8, Nov. 10, 2004.

* cited by examiner

*Primary Examiner*—Saeid Ebrahimi Dehkordy

(57) ABSTRACT

A method, for use on a computer system having a memory, permits a user to index and track digitized images resident in said computer memory. The method comprises creating a scannable contact sheet comprising thumbnail versions of the digitized images, information identifying each image, and at least one instruction for a corresponding designated image, the at least one instruction being manually selectable by the user, and printing out the contact sheet.

Also disclosed is a computer system enabling a user to index and track digitized images resident in a memory accessible by the computer system. The computer system comprises (1) means for creating a scannable contact sheet, the contact sheet comprising thumbnail versions of the digitized images, information identifying each image, and at least one instruction for each image, the at least one instruction being manually selectable by the user; and (2) means for printing out the contact sheet.

18 Claims, 4 Drawing Sheets

US 7,403,302 B2

METHOD AND A SYSTEM FOR INDEXING AND TRACKING DIGITAL IMAGES

BACKGROUND OF THE INVENTION

1. Field of the Invention

The present invention pertains generally to the management of digital image files. More particularly, the invention relates to a method and a system for indexing and tracking digital images.

2. Description of the Related Art

The addition of an automatic photograph feeder (APF) to a desktop flatbed scanner permits a computer user to easily and quickly convert a "shoebox" of ordinary print photographs into a digital format, enabling the photographs to be stored in the mass memory of a personal, notebook, or handheld computer. A drawback of such automated digital imaging and storage systems is the difficulty of indexing, sorting, tracking and ultimately retrieving the stored digital images where, for example, tens or even hundreds of photographs have been scanned into the computer system. A common problem is that the arcane names or numerical identifications automatically assigned to computerized image files are difficult to decipher so that the user is often unable to determine the contents of a particular file from the name alone. Thus, a computer user can end up with numerous digital photographs or images that are difficult to locate or identify by name.

This problem also exists with many of today's digital cameras.

SUMMARY OF THE INVENTION

In accordance with one specific, exemplary embodiment of the invention, there is provided for use on a computer system having access to a memory, a method enabling a user to index and track digitized images resident in said computer memory. The method comprises creating a scannable contact sheet comprising thumbnail versions of the digitized images, information identifying each image, and at least one instruction for each image, the at least one instruction being manually selectable by the user, and printing out the contact sheet.

Pursuant to another specific, exemplary embodiment of the invention, there is provided a computer system enabling a user to index and track digitized images resident in a memory accessible by the computer system. The computer system comprises (1) means for creating a scannable contact sheet, the contact sheet comprising thumbnail versions of the digitized images, information identifying each image, and at least one instruction for each image, the at least one instruction being manually selectable by the user; and (2) means for printing out the contact sheet.

BRIEF DESCRIPTION OF THE DRAWINGS

The foregoing and other objects, features and advantages of the invention will be evident to those skilled in the art from the detailed description, below, taken together with the accompanying drawings, in which.

DETAILED DESCRIPTION

The present invention simplifies the interaction between a user and a personal computer with respect to the handling and manipulation of digital images (for example, photographs) scanned into a computer memory by means of a scanner. In one embodiment, a contact sheet of thumbnail images is created. The sheet is printed out and manually marked up by the user with identifying information and instructions. The sheet is next scanned and the manually-inserted instructions are interpreted and executed. Typical instructions may call for archiving, deleting, copying, printing and e-mailing. The hardcopy contact sheets may be conveniently preserved in a conventional print medium storage means such as a loose leaf binder.

Figure 1:
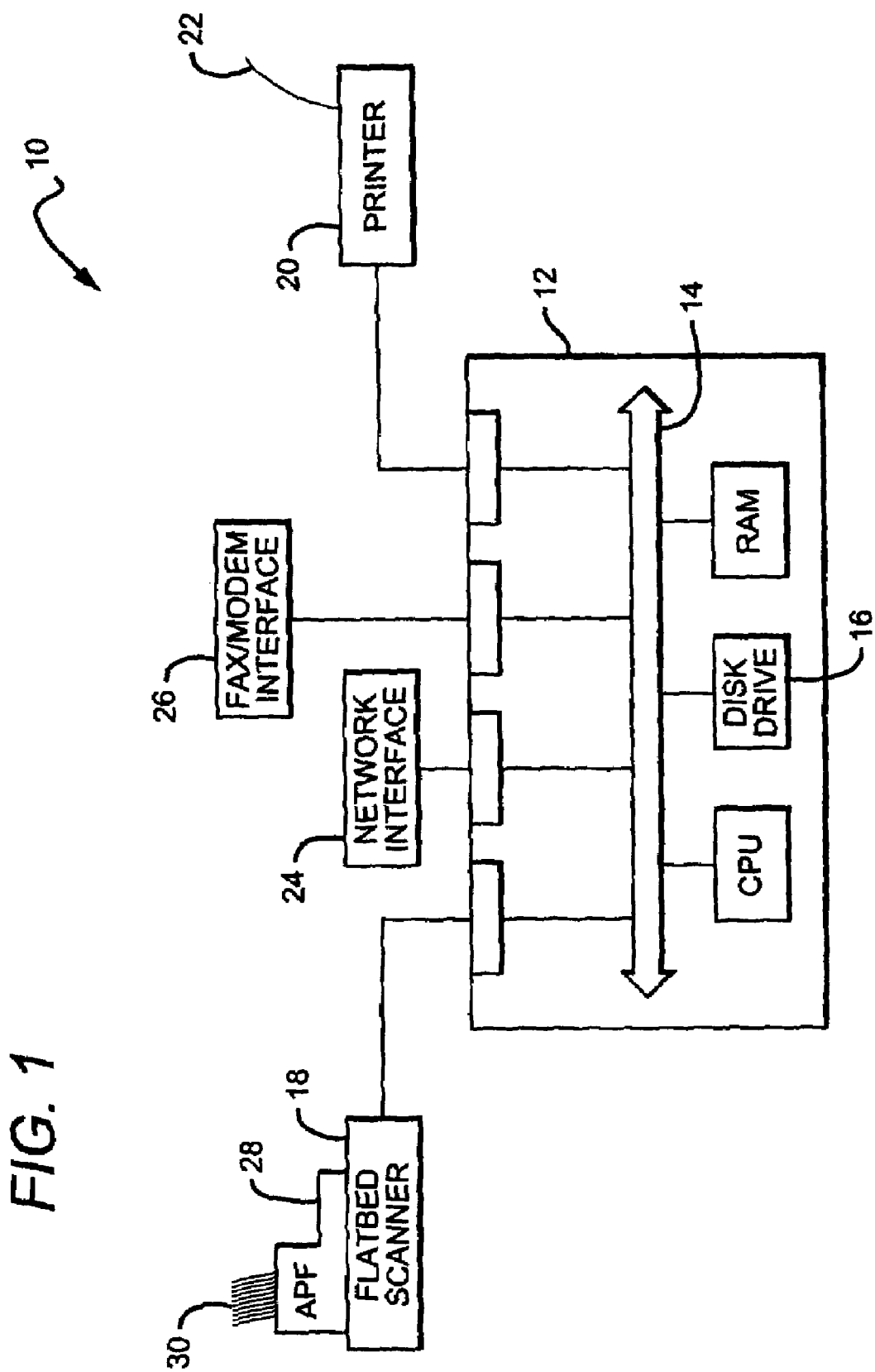
FIG. 1 is a block diagram of an example computer system used with embodiments of the present invention.

With reference to FIG. 1, there is shown a system 10 comprising a computer 12 having a system bus 14 to which are connected numerous devices, including a computer disk drive 16 for storing an operating system, application programs and a web browser. Also stored on the computer disk drive are computer instructions for creating contact sheets and indexing images scanned into the system. When executed, the computer instructions, among other things, compose and create a set of images from the printed photos that are scanned into the system. Also connected to the bus 14 is a flatbed scanner 18 as an input for acquiring image data and a printer 20 as an output enabling the user to print out contact sheets such as sheet 22. The system also includes a network interface 24 and a fax/modem interface 26 which can be used not only to input image and/or text data from other sources but to output such information as well to external hardware devices to the World Wide Web, or to an e-mail addressee.

Mounted on the scanner 18 is an automatic photo feeder (APF) 28 for feeding along the scanner platen a number of print photographs 30 whose images are scanned and converted by the scanner into a digital format in a manner well known in the art. The digitized images are transferred to the computer for storage on the disk drive 16 thereof. Utilizing software whose preparation will be evident to those skilled in the art upon consideration of the teachings of the present invention, the computer creates thumbnails of the images and places them on a contact sheet. The program may automatically associate with each thumbnail some descriptive information, such as a serial number or other unique identifier, along with one or more preselected functions to be applied to each photo. As each contact sheet is filled with thumbnails, the sheet is stored on disk and a hard copy thereof is printed out by the printer. When the scanning of all of the print photographs is complete, the user will have a set of printed contact sheets that can be placed in a binder.

Figure 2A:
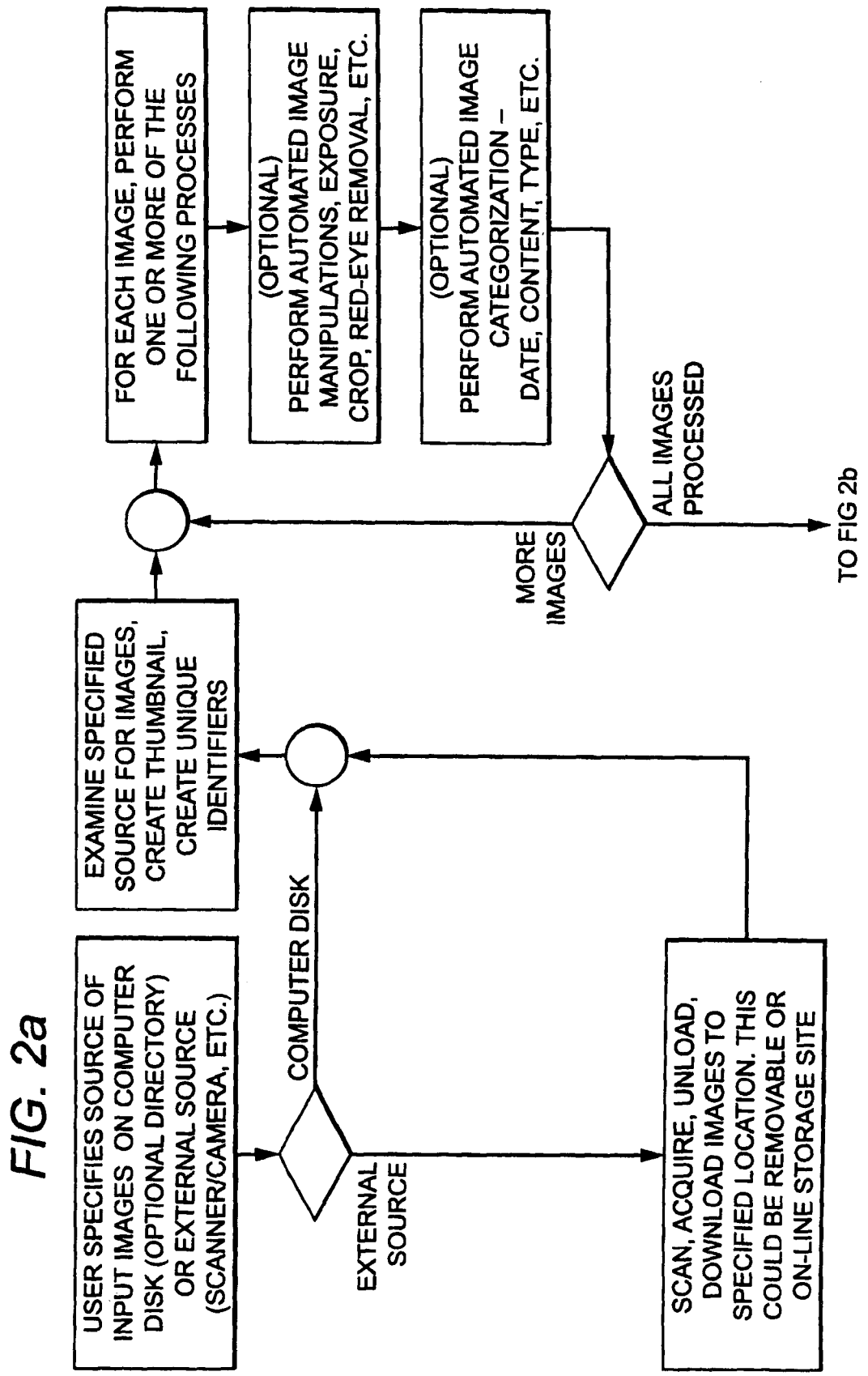
FIGS. 2*a* and 2*b* comprise a flow chart showing the steps for creating a contact sheet in accordance with an embodiment of the invention.
Figure 2B:
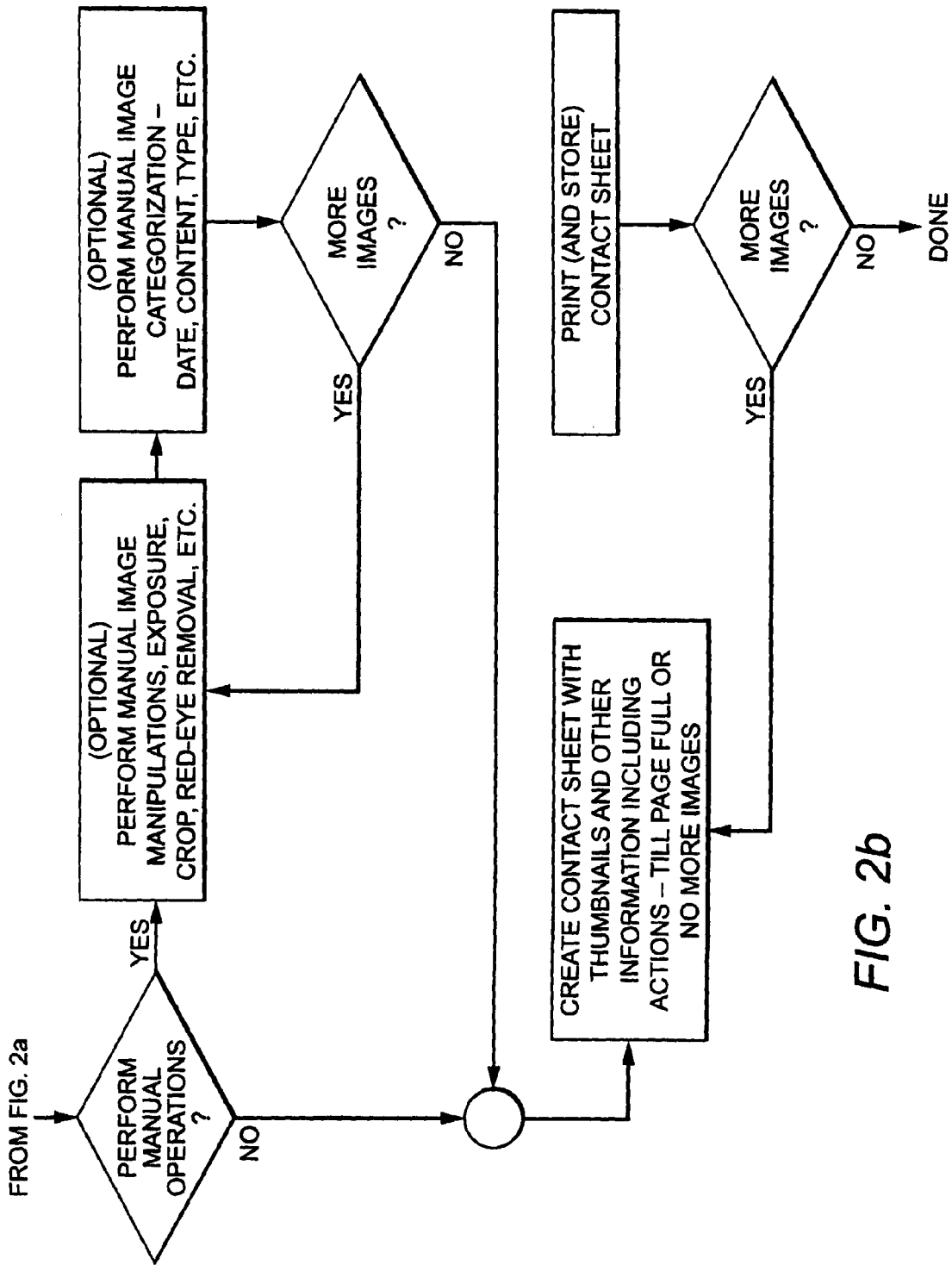
Figure 3:
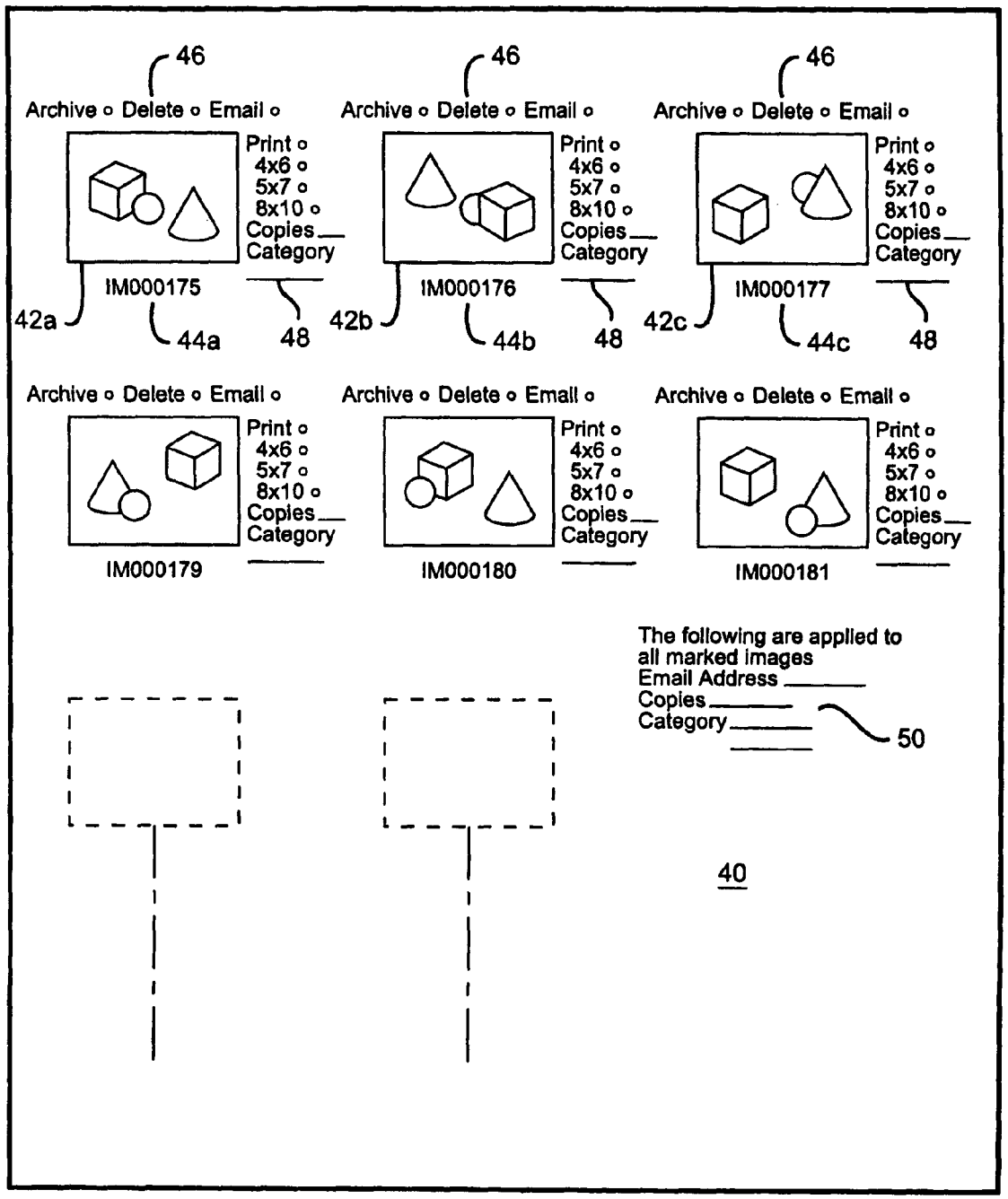
FIG. 3 is an example of a contact sheet created in accordance with the teachings of the present invention.

FIGS. 2*a* and 2*b* comprise a flow chart showing an example of the steps that may be utilized to create a contact sheet according to the invention, and FIG. 3 shows an example of a contact sheet 40 so created. The exemplary contact sheet contains a set of thumbnails 42*a*, 42*b*, and so forth, each having a software-generated identifying number 44*a*, 44*b*, etc., associated therewith. The contact sheet not only provides the user with a paper record of the user's photo collection, but also affords a highly versatile and user-friendly means for creatively utilizing and further processing the digital images. Accordingly, also associated with each thumbnail are commands or instructions 46 such as "Archive", "Delete", "Email", "Print", and so forth, one or more of which may be selected by the user. The user, for example, can fill in a bubble adjacent each instruction to instruct the computer to perform a specific task. Alternatively, the user could place a mark, symbol, indicia, or the like at on, or near the thumbnail to select a command or instruction associated with the thumbnail. Still further, the sample contact sheet provides the user with other options such as blank spaces 48 which can be filled in with additional instructions and information such as the number of "Copies" to be printed, photo category, and so forth. Spaces 50 for inserting global information and instructions, applicable to all selected or marked thumbnails, appearing by way of example under a heading "The following are applied to all marked images ...", may be included. Selection or marking of individual thumbnails may be provided for in various ways, for example, by circling the thumbnail of interest or otherwise identifying or selecting the thumbnail. It will also be evident that there may be provided the ability to change or choose the manual commands or instructions appearing on a contact sheet. Thus, dedicated contact sheets may be created that have different sets of commands. For example, there may be provided a "print" contact sheet with print commands, a "manage" contact sheet with sorting, characterizing and like commands, an "edit" contact sheet with editing commands, and so forth. The specific commands or instructions on a contact sheet can thus be modified by the user.

If a user wishes to printout a particular stored image, or to find the image, the user simply marks the thumbnail of the image on the contact sheet, for example, by circling the thumbnail, and places the contact sheet on the scanner which scans the sheet. The marked photo is identified by an indexing program stored in the computer. The program analyzes the serial or identifying number associated with the thumbnail, locates the image stored on the disk drive, and performs the selected instructions. Preferably, the program also causes a clean replacement contact sheet to be printed out for preservation in the user's binder of contact sheets. A further instruction, not shown, which might be labeled "Interact", could invoke a digital image editing program for manipulating individual photo images and enabling other user interaction.

The system may be readily augmented with additional capabilities. For example, with handwriting recognition, the contact sheets could be marked up by the user with information specific to each photo on the sheet. Following scanning of the marked-up contact sheet, the related photos could be filed and indexed according to the handwritten information. Thus, captions and descriptive text could be added by the user without having to interact with the computer. The invention is moreover compatible with a scanning/photo storage device where there is no user interface. Images scanned and stored on the device are accessible via scanning of the contact sheets. Last, the invention may be applied to any set of digital images stored on the computer, such as those from a digital camera, or scanning/photo storage device without the use of an automatic photo feeder.

The following are several examples, not intended to be exhaustive, of ways in which embodiments of the present invention may be used:

A. Scanning flow, used when a new stack of images are to be scanned:
1. Load APF (automatic photo feeder) with photos or images.
2. Scan images, store images on disk, and create thumbnail of each image as it is stored.
3. Create and print contact sheets showing all the images that have been scanned.

B. Directory read flow, used to create contact sheets based upon images already electronically or digitally stored:
1. Run contact sheet creator.
2. Specify at least one directory to be processed.
3. Create a thumbnail for each image in each specified directory.
4. Print a contact sheet for each specified directory.

C. Re-print flow, used to create re-prints using existing contact sheets:
1. User finds and selects images on the contact sheets.
2. Marks number of reprints wanted and size/layout.
3. Places contact sheet on scanner and runs "reprint" program that:
   a. Scans the contact sheet;
   b. Identifies which images have been marked for reprint, how many copies, etc., reading all of the options on the contact sheet;
   c. Locates the images on the hard disk based upon contact sheet information;
   d. Performs re-prints based upon the information read; and
   e. Creates new contact sheets to replace one marked up.

D. Annotate flow, used to annotate or describe images:
1. User finds images on the contact sheet that user wants to categorize.
2. User marks "categorize" and pre-defined categories on Contact Sheet, or writes in keywords.
3. Marked contact sheets are placed on scanner and the "categorize" program:
   a. Scans the contact sheet;
   b. Identifies the marked images;
   c. Categorizes by pre-defined categories marked or uses handwriting recognition to keyword the images;
   d. Updates the database based upon categorization;
   e. Creates new contact sheets to replace marked up ones or, optionally, creates a "category" contact sheet.

Many other flows will be apparent to those skilled in the art including, but not limited to, an "email" flow in which a contact sheet is marked with instructions to email an image to an email address, and a "web share" flow, in which selected images to be shared on the web is appropriately marked on a contact sheet.

The invention claimed is:

1. For use on a computer system having access to a memory, a method enabling a user to index and track digitized images resident in said memory, the method comprising:
   creating a scannable contact sheet comprising thumbnail versions of the digitized images and at least one instruction for each image, the at least one instruction being manually selectable by the user;
   printing out the contact sheet;
   creating a manually marked-up contact sheet by having a user use handwriting to manually mark-up the contact sheet with handwritten reprint, archive and email instructions and handwritten categorical captions and descriptions for each photo;
   electronically scanning the contact sheet;
   an indexing module configured to electronically file and index each individual photo on the manually marked-up contact sheet according to the handwritten archive and email instructions and the handwritten categorical captions and descriptions; and
   automatically printing an updated contact sheet containing updates based on the handwritten reprint instructions changes made by the manually marked-up contact sheet.

2. The method of claim 1 further comprising:
   interpreting and executing at least one instruction manually selected by the user.

3. The method of claim 2 further comprising:
using a handwriting recognition module to interpret the manually marked-up contact sheet.

4. The method of claim 3 further comprising:
storing the new contact sheet in a storage means for later retrieval by the user.

5. The method of claim 1 in which:
the at least one instruction is selected from the group consisting of archiving, deleting, copying, printing and e-mailing.

6. The method of claim 1 in which:
the at least one instruction is selected by the user by manually placing a mark adjacent to said at least one instruction.

7. The method of claim 1 comprising:
manually designating an image for which said at least one instruction is to be executed, said manual designation being computer-readable.

8. The method of claim 7 in which:
said manual designation is performed by the user by circling the designated image.

9. The method of claim 1 in which:
the digitized images comprise photographs.

10. A method, comprising:
converting a plurality of printed images into digital images;
storing the digital images;
printing thumbnail views of the digital images onto a contact sheet;
manually marking the contact sheet with an instruction by having a user use handwriting to manually mark-up the contact sheet with handwritten reprint, archive and email instructions and handwritten categorical captions and descriptions for each photo;
scanning the contact sheet into a computer to read the instruction;
executing the instruction by the computer;
electronically filing and indexing each individual photo on the manually marked-up contact sheet according to the handwritten archive and email instructions and the handwritten categorical captions and descriptions; and
automatically printing an updated contact sheet containing updates based on the handwritten reprint instructions changes made by the manually marked-up contact sheet.

11. The method of claim 10 wherein manually marking the contact sheet further comprises selecting at least one thumbnail view and providing at least one instruction to be performed with a digital image associated with the selected thumbnail view.

12. The method of claim 11 wherein the at least one instruction is selected from the group consisting of e-mailing or printing.

13. The method of claim 10 wherein manually marking the contact sheet further comprises placing a physical mark on the contact sheet on, at, or adjacent at least one thumbnail view.

14. The method of claim 10 wherein manually marking the contact sheet further comprises designating a command to be automatically performed by the computer upon executing the instruction.

15. The method of claim 10 further comprising automatically printing by the computer a new contact sheet after scanning the contact sheet into the computer.

16. The method of claim 10 wherein executing the instruction comprises:
retrieving from memory at least one digital image associated with a selected thumbnail view; and
printing the at least one digital image.

17. A computer system enabling a user to index and track digitized images resident in a memory accessible by said computer system, the computer system comprising:
means for creating a scannable contact sheet, said contact sheet comprising thumbnail versions of the digitized images associated with at least one of the digitized images and at least one instruction for each image, the at least one instruction being manually selectable by the user; and
means for printing out the contact sheet;
means for creating a manually marked-up contact sheet by having a user use handwriting to manually mark-up the non-film paper hardcopy contact sheet with handwritten reprint, archive and email instructions and handwritten categorical captions and descriptions for each photo;
means for scanning the contact sheet; and
means for electronically filing and indexing each individual photo on the manually marked-up contact sheet according to the handwritten archive and email instructions and the handwritten categorical captions and descriptions; and
means for automatically printing an updated contact sheet containing updates based on the handwritten reprint instructions changes made by the manually marked-up contact sheet.

18. The computer system of claim 17 further comprising:
interpreting and executing at least one instruction manually selected by the user.

\* \* \* \* \*

UNITED STATES PATENT AND TRADEMARK OFFICE
CERTIFICATE OF CORRECTION

| | | |
|---|---|---|
| PATENT NO. | : 7,403,302 B2 | Page 1 of 1 |
| APPLICATION NO. | : 10/636418 | |
| DATED | : July 22, 2008 | |
| INVENTOR(S) | : Robert G. Gann | |

It is certified that error appears in the above-identified patent and that said Letters Patent is hereby corrected as shown below:

In column 6, line 35, in Claim 17, after "sheet;" delete "and".

Signed and Sealed this

Nineteenth Day of May, 2009

JOHN DOLL
*Acting Director of the United States Patent and Trademark Office*